United States Patent [19]
Hanna et al.

[11] Patent Number: 5,581,629
[45] Date of Patent: Dec. 3, 1996

[54] METHOD FOR ESTIMATING THE LOCATION OF AN IMAGE TARGET REGION FROM TRACKED MULTIPLE IMAGE LANDMARK REGIONS

[75] Inventors: Keith J. Hanna, Princeton; Rakesh Kumar, Dayton, both of N.J.

[73] Assignee: David Sarnoff Research Center, Inc, Del.

[21] Appl. No.: 380,484

[22] Filed: Jan. 30, 1995

[51] Int. Cl.$^6$ ..................................................... G06K 9/00
[52] U.S. Cl. ........................ 382/103; 382/284; 382/291; 382/298
[58] Field of Search .................................. 382/48, 23, 31, 382/25, 22, 1, 103, 282, 201, 210, 203, 199, 284, 291, 298; 348/135, 143, 144, 161, 169

[56] References Cited

U.S. PATENT DOCUMENTS 5,034,986  7/1991  Karmann et al. .............................. 382/1
5,144,685  9/1992  Nasar et al. ................................. 382/48

*Primary Examiner*—Joseph Mancuso
*Assistant Examiner*—Bipin Shalwala
*Attorney, Agent, or Firm*—William J. Burke

[57] ABSTRACT

An image processing method for inserting a given pattern at a target region having a particular location with respect to a scene being viewed by an image sensor over a period of time, wherein the method employs a world map having stored therein the relative position of the location and the pose of multiple pre-trained reference image patterns of landmark regions in the scene with respect to that of the target region. The method comprises dynamic computation steps for inferring the size and position of the particular location within each of ongoing successive image frames of the scene from the shape, size and position of at least one of said multiple landmark regions represented within each of successive image frames of the scene, despite inaccuracies in the parametric model estimation relating the current image with the pre-trained reference image and changes over time in the shape, size and position of the image patterns of the multiple landmark regions from those of the pre-trained reference image patterns of the landmark regions stored in the world map.

7 Claims, 2 Drawing Sheets 5,581,629

METHOD FOR ESTIMATING THE LOCATION OF AN IMAGE TARGET REGION FROM TRACKED MULTIPLE IMAGE LANDMARK REGIONS

The invention relates to an improved method suitable for use in the pattern-key insertion of extraneous image data in a target region of a background image such as a video image.

BACKGROUND OF THE INVENTION

Incorporated herein by reference is the disclosure of copending U.S. patent application Ser. No. 08/115,810, filed Sep. 3, 1993, and entitled "Video Merging Employing Pattern-key Insertion", which is assigned to the same assignee as the present application. As taught in that patent application, pattern-key insertion is used to derive a composite image by merging foreground and background. The implementation techniques used for this purpose is one in which an estimate of the location of a target region can be inferred from the tracked location of any of multiple landmark regions in the background image. The location of each of the multiple landmark regions may be displaced in a different direction from the location of the target region, so that in case the video scene is such that the target region itself moves partially or completely beyond a particular edge of the image, at least one of the tracked multiple landmark regions remains within the image so that even if the location of the target region itself is partially or wholly outside of the image field of view, inferred tracking of the target region itself can still be continuously maintained. In addition, any of the tracked multiple landmark regions in the image may be occluded at times by the presence of a foreground object in the scene, so it cannot be used at such times for inferring the location of the target region. In such a case, another of the tracked multiple landmark regions in the image must be used instead. However, it has been found that switching from one tracked multiple landmark region to another tracked multiple landmark region for use in inferring the location of the target pattern results in model errors that cause unstable estimates of the location of the target pattern.

Such model errors could be reduced by fitting higher order models to the respective tracked multiple landmark regions so that they are tracked better. Such higher order models are unstable to estimate from a single image frame, and biased errors in local estimates introduce estimation errors that are difficult to model a priori.

Further incorporated herein by reference is the disclosure of copending U.S. patent application Ser. No. 08/222,207, filed Mar. 31, 1994, and entitled "Stabilizing Estimate of Location of Target Region Inferred from Tracked Multiple Landmark Regions of a Video Image", which is also assigned to the same assignee as the present application. Taught in that patent application is an efficient method for performing stable video insertion of a target pattern even when different ones of multiple landmark regions are tracked at different time intervals for use in inferring the location of the target region from the location of that particular one of the multiple landmark regions then being tracked. Specifically, due to occlusion or disocclusion by foreground objects, or disappearance or appearance as the camera pans and zooms across a scene, the tracking landmark region is switched from one of the multiple landmark regions to another. This works well only when landmark regions are visible, are unchanging over time, and when the model relating the current image to the reference image fits accurately.

SUMMARY OF THE INVENTION

The present invention is directed to an improved method for deriving stable estimates of the location of the target pattern in an image when the parametric model relating the current image and the pre-trained reference images is inaccurate, and when landmark regions themselves in the image change over time caused, by way of examples, (1) by a landmark region being occluded by the introduction of an object not originally present or (2) by a change in the shape of a landmark region's intensity structure (as opposed to merely to a change in its overall brightness magnitude) due to illumination effects, such as shadows, that depend heavily on the direction of illumination, or (3) by disappearing from the image sensor's field of view.

More specifically, the present invention is directed to an improvement in an image processing method for inserting a given pattern at a target region having a particular location with respect to a scene being viewed by an image sensor over a period of time, wherein the method employs a world map having stored therein the relative position of the location and the pose of at least one of multiple pre-trained reference image patterns of landmark regions in the scene with respect to that of the target region; and wherein the method comprises computation steps for inferring the size and position of the particular location within each of ongoing successive image frames of the scene from the shape, size and position of the one of the multiple landmark regions represented within each of successive image frames of the scene.

In the improved method, the computation steps comprise the steps of (a) initially employing a model whose image-change-in-position parameters are computed between the first-occurring image field of the successive image frames and the pre-trained reference image pattern for determining the shape, size and position of the one of the multiple landmark regions represented by the first-occurring image field of the successive image frames; and (b) thereafter employing a model whose image-change-in-position parameters are dynamically computed by a given function of those image fields of the successive image frames that precede the current image field for determining the shape, size and position of the one of the multiple landmark regions represented by the current image field of the successive image frames.

DESCRIPTION OF THE PREFERRED EMBODIMENTS

Figure 1:
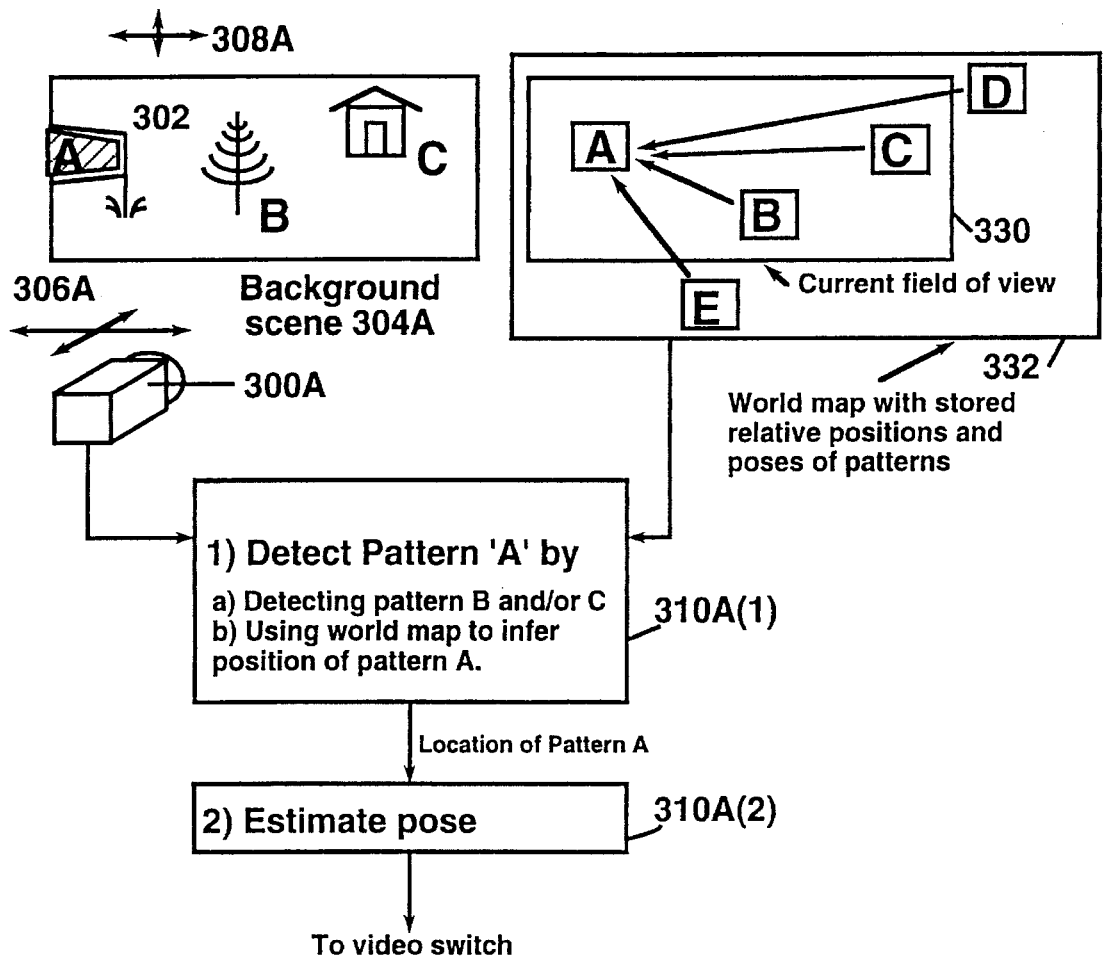
FIG. 1, which is identical to FIG. 6 of the aforesaid patent application Ser. No. 08/115,810, shows an example of landmark region tracking.

The aforesaid patent application Ser. No. 08/115,810, is broadly directed to various ways of replacing a first target pattern in an image, such as a video image, (which first target pattern may be located on a billboard) with an inserted second target pattern. As taught therein, the location of the first target pattern may be detected directly or, alternatively, indirectly by inferring its position from the respective positions of one or multiple landmarks in the scene. FIG. 1 (which is identical to FIG. 6 of the aforesaid patent application Ser. No. 08/115,810) shows one indirect way this may be accomplished.

Referring to FIG. 1, background scene 304A consists of the current field of view of image sensor 300A such as a television camera. As indicated, the current field of view includes the target (billboard 302 comprising logo pattern "A") and landmarks B (a tree) and C (a house), with each of the target and landmarks being positionally displaced from one another. As indicated by blocks 330, the current field of view, and 332, the world map, the target A and landmarks B and C, comprising the current field of view 330 of a landmark region, form only a portion of the stored relative positions and poses of patterns of the world map 332 of the landmark region. These stored patterns (which were earlier recorded during a training stage) also include landmarks D and E which happen to be outside of the current field of view of the landmark region, but may be included in an earlier or later field of view of the landmark region. Means 310A(1), responsive to inputs thereto from both sensor 300A and block 332, is able to derive an output therefrom indicative of the location of target A whether pattern A is completely in the field of view, is partially in the field of view, or only one or more landmarks is in the field of view. Means 310A(1) detects pattern A by detecting pattern B and/or C and using world map 332 to infer the position of pattern A. The output from means 310A(1), the location of pattern A, is applied to means 310A(2), not shown, which estimates pose in the manner described above. The output of means 310A(2) is then connected to a video switch (not shown).

Landmark region tracking is also useful when the target itself happens to be occluded in the current field of view, so that its location must be inferred from the locations of one or more non-occluded landmarks.

Landmark region tracking will only solve the problem if the target pattern leaves or enters the field of view in a particular direction. In the example shown in FIG. 1, where each of the landmark patterns within the landmark region lies to the right of the target pattern, landmark pattern tracking only solves the problem if the target pattern leaves the field of view on the left-hand-side of the image.

Multiple landmark tracking overcomes the problem. Instead of detecting a single landmark (or target) pattern, the system could choose to detect one or more landmark patterns within different landmark regions depending on which pattern(s) contributed most to inferring the position of the target pattern. For example, if the target pattern is leaving the field of view on the left-hand-side, then the system could elect to detect a landmark pattern towards the right of the target pattern. On the other hand, if the target pattern is leaving the field of view on the right-hand-side, the system could elect to detect a landmark pattern towards the left of the target pattern. If more than one landmark pattern is visible, the system could elect to detect more than one landmark pattern at any one time in order to infer the position of the target pattern even more precisely. As taught in the prior art, this system can be implemented using the results of pattern detection in a previous image in the background sequence to control pattern detection in the next image of the sequence. Specifically, the system uses the position of the landmark pattern that was detected in the previous image to infer the approximate positions of other landmark patterns in the previous image. These positions are inferred in the same way the position of the target pattern is inferred from a single landmark pattern. The system then elects to detect in the current image the landmark pattern that was nearest the target pattern in the previous image, and that was sufficiently far from the border of the previous image. As a result, when a detected landmark region becomes close to leaving the field of view of the background scene, the system elects to detect another landmark region that is further from the image border.

A problem that can occur is that the appearance of landmarks chosen during the training step changes over time. Changes in appearance caused by changes in overall scene brightness are not problematic since the match techniques described in the aforesaid patent application Ser. No. 08/115,810 are capable of recognition and tracking under this circumstance. However, circumstances that change the shape of the intensity structure (as opposed to it's magnitude) are more problematic. Some changes in intensity structure are due to actual changes in the objects in the scene: for example, a car may be parked in the scene, but at the earlier time at which that scene was recorded for storage in the world map (i.e., during the training stage) this car might not have been present. Other changes can occur if the images of the landmarks are caused by illumination effects rather than direct reflectance changes in a physical material. Examples include shadows. These types of landmarks can change over time since the shape of the intensity structure depends heavily on the direction of the, illumination. There are two problems these changes can introduce. First, a landmark identified during the training stage may not match the corresponding landmark at a later time interval rendering it useless to contribute to the recognition and coarse tracking steps described in the aforesaid patent application Ser. No. 08/115,810. Second, even if the landmark matches sufficiently well for recognition and coarse tracking, performance of the precise alignment step described in the aforesaid patent application Ser. No. 08/115,810 can be influenced adversely, since it must align the current image of the landmark with the pre-trained landmark to high precision.

An additional problem occurs when using landmarks whose 3D position in a scene incurs a non 2D transform between the current image of the landmark and the image from which they were trained. The problem is that the precise alignment step described in the aforesaid patent application Ser. No. 08/115,810 only has a useful range of approximately 1 to 2 pixels at the image resolution being processed. If the model being fit between the training image and the current image has an error of this magnitude across the landmark, then the precise alignment may not yield reproducible results. In video insertion, model reproducibility is usually much more important than model accuracy, since the result of reproducible but inaccurate precise alignment is a stable insert, but in slightly the wrong position, whereas the result of irreproducible results is an unstable insertion that is highly noticeable.

To solve these problems, the present invention combines landmark information acquired at the training stage with more recent landmark information acquired dynamically. Landmark information acquired at the training stage is used for initial identification of the scene and to prevent drift of the estimated position of objects in the scene. Landmark information acquired dynamically has the purpose of locating positions in the scene with respect to positions located a few tens or hundreds of fields previously. Acquiring landmarks dynamically has three key advantages. First, the landmarks are acquired much more recently than in the training image so that they are much less likely to have changed. This makes the recognition and tracking components more reliable, and improves the precision of the precise alignment step under the circumstances of changing landmarks described above. Second, the pose of the camera when the landmarks are acquired is likely to be much more similar to the current pose of the camera, since the camera usually pans and zooms in a consistent fashion. The result of this is that a model fit between the recently-acquired landmark image and the current image is much more likely to match precisely, making the precise alignment step reproducible, which, in turn, causes stable insertion of video. Also, since the model fits more accurately, outlier rejection based on errors in the model work more effectively. Outlier rejection is used to prevent false matching of landmarks which can interfere with the estimation accuracy of the location of the target region. Third, image regions containing non-specific landmarks, such as ground texture or a crowd scene can be used for tracking.

A first embodiment for implementing the present invention is to perform initial recognition and location using pre-trained landmark regions stored in the world map and to perform subsequent positioning by integrating the position difference computed between the images of each pair of successive fields. Computation that involves integration is susceptible to drift since small errors in the estimation process can accumulate rapidly. This first embodiment provides a first solution to this problem by allowing a small component of the computed position to be derived from the current image and the pre-trained image. Specifically, the position P of a landmark region in a current image can be expressed as:

$$P = \sum_{1}^{n} \alpha * Q(n) + (1 - \alpha) * R(n_0),$$

where the relative position component $Q(n)$ is the model whose image-change-in-position parameters are computed between the images of each pair of successive fields, and where the absolute position component $R(n_O)$ is the model whose image-change-in-position parameters are computed between the current field image and the pre-trained reference image pattern, and where a is a weighting parameter of value 0 to 1 that controls the relative contributions of the position estimate P from the dynamically recovered landmark regions and the pre-trained landmark regions. Typical values of a are 0 employed in the first field of a scene to achieve a first position estimate, 0.9 employed in the next 4 fields until stable tracking has been assured, and 0.99 employed in subsequent fields.

Figure 2:
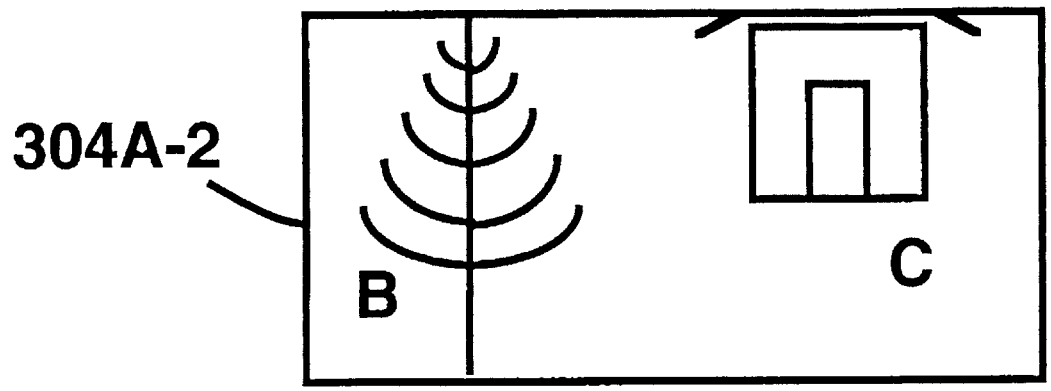
FIG. 2 shows an image of a scene in which the area of landmark regions of the scene occupy a relatively large portion of the total area of the image.

This first embodiment works well when the model $Q(n)$ is computed reproducibly, with high accuracy, and with an estimation error that is almost zero-mean. A near zero-mean estimation error has the benefit that when the errors are accumulated by the integration step, the result is almost zero and will not influence the position estimate adversely. These desirable conditions usually occur when relatively large image areas (such as shown in FIG. 2) are used to compute the relative positions of successive fields. The impact of local biases in the estimation process caused by feature aliasing or feature changes are then averaged across the large region, and assuming that the local effects are not correlated globally, local errors are likely to sum to have insignificant or zero impact on the final result. Also the region used for performing position estimation is substantially the same from field to field, so any influence on the result from image areas that are appearing or disappearing from the field of view is minimal if the camera motion is a small fraction of the area being analyzed.

Figure 3:
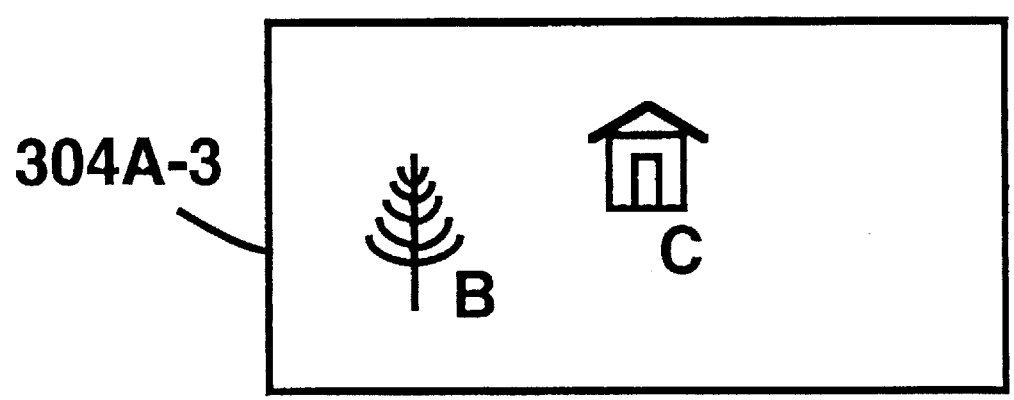
FIG. 3 shows an image of a scene in which the area of landmark regions of the scene occupy a relatively small portion of the total area of the image.

However, in many tracking and video insertion applications these desirable conditions, which permit the first solution provided by the first embodiment to work well, are not present. For instance, often it is not possible to use large areas of the image because occluding objects obscure a significant percentage of the field of view. Performing tracking in this circumstance means that relatively small image areas must be used and that position estimation is performed on image regions that continually vary from field to field. Using small image regions (such as shown in FIG. 3) means that local biases in the estimation process caused in particular by changes in the landmark region of interest used for the position estimate has a significant influence on the result. In addition, the position estimate is computed using different ones of the multiple landmark regions on successive fields depending on which of the landmark regions are unoccluded (as described in both the aforesaid patent applications Ser. Nos. 08/115,810 and 08/222,207). The result is a small error in the position estimate that is not necessarily a zero-mean error. When this is integrated using the equation above, a significant component of the result can be due to the integrated error leading to an incorrect estimate of the position estimate P. This was not a problem in the techniques described in the aforesaid patent applications Ser. Nos. 08/115,810 and 08/222,207, since transforms were computed with respect to fixed reference image patterns. The small errors in the position estimate were not integrated so they were not significant.

A second embodiment for implementing the present invention provides a second solution that does not depend on the desirable conditions, which permit the first solution to work being present. This second solution performs position estimates not between the images of each pair of successive fields, but between the image of the current field and a dynamic reference image pattern that is updated regularly every few seconds. Specifically, the position P, as a function of time T, can be expressed by the following equations:

$0<T \leq T_1$, $P=R(n_0)$, $T_1<T \leq 2T_1$, $P=R(n_1)$, $2T_1<T \leq 3T_1$, $P=R(n_2)$, and, in general, $kT_1<T \leq (k+1)T_1$, $P=R(n_k)$, where T is the elapsed time since the beginning of the first-occurring image field of said successive image frames; $T_1$ is a specified update time interval; k is an integer having a value of at least one; $R(n_0)$ is the model whose image-change-in-position parameters are computed between the current field image and the pre-trained reference image pattern, and $R(n_k)$ is the model whose image-change-in-position parameters are computed between the presently current field image and that field image which was current at time $kT_1$ (the latter field image being employed as the most recent substitute reference image pattern for the originally employed pre-trained reference image pattern).

This approach means that at least over the update time interval, there will be zero-mean type errors in the position estimate because the image regions to which the current image is being compared will be fixed rather than dynamic. By way of example, if the error in the position estimate is 1/20 pixel per field, non zero-mean type errors can potentially accumulate at the rate of 60 Hz*1/20=3 pixels per second. However, if the reference image pattern is updated only every 4 seconds ($T_1$=4 seconds), then the effect of non zero mean type errors is reduced to 3 pixels/(4*60 Hz) which is equal to 0.0125 pixel per second. If errors of 0.1 pixel are noticeable, then potentially errors will be noticed after 0.1/0.0125 =8 seconds.

Preferably, the above-described weighting parameter $\alpha$ and the absolute position component $R(n_0)$ should be used to prevent long-term drift of the position estimate. In this case, $$0<T\leq T_1, P=R(n_0),$$

and $$T>T_1, P=\alpha*R(n_k)+(1-\alpha)*R(n_0).$$

In the above example, drift position errors, which tend to accumulate with the passage of time, are reduced by the absolute position component $R(n_0)$ being present in this last equation will then have a significant impact on the position estimate with values of a even close to unity. This is true because (1) the image-change-in-position parameters of $R(n_k)$, computed between the presently current field image and that field image which was current at time $kT_1$ involves a total number of fields that can be fewer than or equal to 240 fields (4 seconds times 60 Hz), but can never be greater than 240 fields, while (2) the image-change-in-position parameters $R(n_0)$ computed between the current field image and the pre-trained reference image pattern involves a total number of fields between k*240 fields and (k+1)*240 fields. Since the value of k grows higher and higher as time passes, the relative significance of $R(n_0)$ with respect to that of $R(n_k)$ becomes larger and larger with the passage of time.

I claim:

1. In an image processing method suitable for use in pattern-key insertion of extraneous foreground image data in a target region of a background image to derive thereby a composite image, said target region having a particular location with respect to a scene being viewed by an image sensor over a period of time, wherein said method employs a world map having stored therein the relative position of the location and the pose of at least one of multiple pre-trained reference image patterns of landmark regions in said scene with respect to that of said target region; wherein said method comprises computation steps for inferring the size and position of said particular location within each of ongoing successive image frames of said scene from the shape, size and position of said one of said multiple landmark regions represented within each of successive image frames of said scene; and wherein the intensity structure of said one of said multiple landmark regions represented within each of successive image frames of said scene may change over time with respect to the intensity structure of the pre-trained reference image pattern of said one of said multiple landmark regions; the improvement wherein said computation steps comprise the steps of:

a) only initially employing a model whose image-change-in-position parameters are computed between the first-occurring image field of said successive image frames and the pre-trained reference image pattern for determining the shape, size and position of said one of said multiple landmark regions represented by the first-occurring image field of said successive image frames; and b) thereafter employing a model whose image-change-in-position parameters are dynamically computed in accordance with a given function of the number of those image fields of said successive image frames that precede the current image field for determining the shape, size and position of said one of said multiple landmark regions represented by the current image field of said successive image frames, wherein P is the position of said one of said multiple landmark regions in said current image field; and said given function comprises the equation $$P = \alpha * \sum_{1}^{n} Q(n) + (1-\alpha) * R(n_0),$$

where n represents the ordinal number of the current image field in a series of successive fields that starts with the first field of the first image frame of said successive image frames and extends to said the current image field, where Q(n) is a component of said model whose image-change-in-position parameters are computed between the images of each pair of fields of said successive image frames up to and including the current image field, where $R(n_0)$ is a component of said model whose image-change-in-position parameters are computed between the current field image and the pre-trained reference image pattern, and where $\alpha$ is a weighting parameter having a value of 0 during the first-occurring pair of fields of said successive image frames and having a value larger than 0 and smaller than 1 during each pair of fields of said successive image frames which occur subsequent to said first-occurring pair of fields of said successive image frames.

2. The method defined in claim 1, wherein:

said weighting parameter $\alpha$ has a value of substantially 0.9 during each of the second-occurring to fifth-occurring pair of fields of said successive image frames and a value of substantially 0.99 during each pair of fields of said successive image frames subsequent to said fifth-occurring pair of fields of said successive image frames.

3. In an image processing method suitable for use in pattern-key insertion of extraneous foreground image data in a target region of a background image to derive thereby a composite image, said target region having a particular location with respect to a scene being viewed by an image sensor over a period of time, wherein said method employs a world map having stored therein the relative position of the location and the pose of at least one of multiple pre-trained reference image patterns of landmark regions in said scene with respect to that of said target region; wherein said method comprises computation steps for inferring the size and position of said particular location within each of ongoing successive image frames of said scene from the shape, size and position of said one of said multiple landmark regions represented within each of successive image frames of said scene; and wherein the intensity structure of said one of said multiple landmark regions represented within each of successive image frames of said scene may change over time with respect to the intensity structure of the pre-trained reference image pattern of said one of said multiple landmark regions; the improvement wherein said computation steps comprise the steps of:

a) only initially employing a model whose image-change-in-position parameters are computed between the first-occurring image field of said successive image frames and the pre-trained reference image pattern for determining the shape, size and position of said one of said multiple landmark regions represented by the first-occurring image field of said successive image frames; and b) thereafter employing a model whose image-change-in-position parameters are dynamically computed in accordance with a given function of the number of those image fields of said successive image frames that precede the current image field for determining the shape, size and position of said one of said multiple landmark regions represented by the current image field of said successive image frames, wherein the position of said current image field of said one of said multiple landmark regions is P and said given function comprises the following equations:

$$0 < T \leq T_1, P = R(n_0),$$

and $$kT_1 < T \leq (k+1)T_1, P = R(n_k),$$

where T is the elapsed time since the beginning of the first-occurring image field of said successive image frames; $T_1$ is a specified update time interval; k is an integer having a value of at least one; $R_,(n_0)$ is a component of said model whose image-change-in-position parameters are computed between the current field image and the pre-trained reference image pattern, and $R(n_k)$ is a component of said model whose image-change-in-position parameters are computed between the presently current field image and that field image which was current at time $kT_1$.

4. The method defined in claim 3, wherein:
the fields of said successive image frames occur at a field rate of 50 or 60 Hz, and said specified update time interval $T_1$ is substantially four seconds.

5. In an image processing method suitable for use in pattern-key insertion of extraneous foreground image data in a target region of a background image to derive thereby a composite image, said target region having a particular location with respect to a scene being viewed by an image sensor over a period of time, wherein said method employs a world map having stored therein the relative position of the location and the pose of at least one of multiple pre-trained reference image patterns of landmark regions in said scene with respect to that of said target region; wherein said method comprises computation steps for inferring the size and position of said particular location within each of on going successive image frames of said scene from the shape, size and position of said one of said multiple landmark regions represented within each of successive image frames of said scene; and wherein the intensity structure of said one of said multiple landmark regions represented within each of successive image frames of said scene may change over time with respect to the intensity structure of the pre-trained reference image pattern of said one of said multiple landmark regions; the improvement wherein said computation steps comprise the steps of:

a) only initially employing a model whose image-change-in-position parameters are computed between the first-occurring image field of said successive image frames and the pre-trained reference image pattern for determining the shape, size and position of said one of said multiple landmark regions represented by the first-occurring image field of said successive image frames; and b) thereafter employing a model whose image-change-in-position parameters are dynamically computed in accordance with a given function of the number of those image fields of said successive image frames that precede the current image field for determining the shape, size and position of said one of said multiple landmark regions represented by the current image field of said successive image frames, wherein the position of said current image field of said one of said multiple landmark regions is P; and said given function comprises the equations $$0 < T \leq T_1, P = R(n_0),$$

and $$T > T_1 P = \alpha * R(n_k) + (1-\alpha) * R(n_0),$$

where T is the elapsed time since the beginning of the first-occurring image field of said successive image frames; $T_1$ is a specified update time interval; k is an integer having a value of at least one; $R(n_0)$ is a component of said model whose image-change-in-position parameters are computed between the current field image and the pre-trained reference image pattern; $R(n_k)$ is a component of said model whose image-change-in-position parameters are computed between the presently current field image and that field image which was current at time $kT_1$, and where $\alpha$ is a weighting parameter having a value larger than 0 and smaller than 1.

6. The method defined in claim 5, wherein:
said weighting parameter $\alpha$ has a value of substantially 0.99.

7. The method defined in claim 6, wherein:
the fields of said successive image frames occur at a field rate of 50 or 60 Hz, and said specified update time interval $T_1$ is substantially four seconds.

* * * * *